(12) United States Patent
Sercel et al.

(10) Patent No.: US 12,729,019 B2
(45) Date of Patent: Sep. 8, 2026

(54) DEPLOYABLE LUNAR LANDING PADS FOR SPACE MINING APPLICATIONS

(71) Applicant: Trans Astronautica Corporation, Lake View Terrace, CA (US)

(72) Inventors: Joel C. Sercel, Lake View Terrace, CA (US); James G. Small, Sonoita, AZ (US)

(73) Assignee: Trans Astronautica Corporation, Lake View Terrace, CA (US)

( * ) Notice: Subject to any disclaimer, the term of this patent is extended or adjusted under 35 U.S.C. 154(b) by 936 days.

(21) Appl. No.: 17/586,268

(22) Filed: Jan. 27, 2022

(65) Prior Publication Data

US 2024/0300677 A1 Sep. 12, 2024

Related U.S. Application Data

(60) Provisional application No. 63/142,868, filed on Jan. 28, 2021.

(51) Int. Cl.
*B64G 1/62* (2006.01)
*B64G 1/22* (2006.01)

(52) U.S. Cl.
CPC .......... *B64G 1/623* (2023.08); *B64G 1/2225* (2023.08)

(58) Field of Classification Search
CPC .......... B64G 1/62; B64G 1/623; B64G 1/625; B64G 1/22; B64G 1/222; B64G 1/2221; B64G 1/2222; B64G 1/2225; B64G 1/2227; B64F 1/007; B64U 70/00; B64U 70/80; B64U 70/87; B64U 70/90; B64U 70/92
See application file for complete search history.

(56) References Cited

U.S. PATENT DOCUMENTS

| | | | |
|---|---|---|---|
| 1,964,189 | A | 6/1934 | Koomans |
| 2,930,187 | A | 3/1960 | Chillson |
| 2,945,234 | A | 7/1960 | Driscoll |
| 2,975,592 | A | 3/1961 | Fox |
| 2,990,836 | A | 7/1961 | Bird |
| 2,991,617 | A | 7/1961 | Nerad |

(Continued)

FOREIGN PATENT DOCUMENTS

| | | |
|---|---|---|
| AU | 2007200666 A1 | 8/2007 |
| CN | 103075816 | 5/2013 |

(Continued)

OTHER PUBLICATIONS

Thangavelu, Madhu, and Andrew M. Chao. "PocketPadTM: Concept for an Expendable Safe Lander Touchdown Accessory." AIAA Space 2016. 2016. 5355. (Year: 2016).*

(Continued)

*Primary Examiner* — Timothy D Collins
(74) *Attorney, Agent, or Firm* — Knobbe, Martens, Olson & Bear, LLP

(57) ABSTRACT

A landing pad for deployment on a celestial body includes a deployable surface configured to be stored in a stowed configuration on a spacecraft and be deployed into a deployed configuration on a surface of the celestial body, a landing system configured to land the landing pad on the surface of the celestial body, and a control system configured to control the landing system during landing of the landing pad on the surface of the celestial body and control the deployment of the deployable surface.

16 Claims, 2 Drawing Sheets

(56) References Cited

U.S. PATENT DOCUMENTS 3,063,521 A 11/1962 Fuller
3,064,418 A 11/1962 Sanders
3,202,998 A 8/1965 Hoffman
3,564,253 A 2/1971 Buckingham
3,597,923 A 8/1971 Simon
3,606,211 A 9/1971 Roersch et al.
4,013,885 A 3/1977 Blitz
4,073,138 A 2/1978 Beichel
4,122,239 A 10/1978 Riboulet
4,135,489 A 1/1979 Jarvinen
4,263,895 A 4/1981 Colao
4,286,581 A 9/1981 Atkinson, Jr.
4,449,514 A 5/1984 Selcuk
4,459,972 A 7/1984 Moore
4,480,677 A 11/1984 Henson et al.
4,528,978 A 7/1985 Robinson
4,564,275 A 1/1986 Stone
4,771,599 A 9/1988 Brown
4,771,600 A 9/1988 Limerick
4,781,018 A 11/1988 Shoji
4,815,443 A 3/1989 Vrolyk
4,932,910 A 6/1990 Hayday
5,014,131 A 5/1991 Reed et al.
5,047,654 A 9/1991 Newman
5,104,211 A 4/1992 Schumacher et al.
5,114,101 A 5/1992 Stern et al.
5,138,832 A 8/1992 Pande
5,198,607 A 3/1993 Livingston
5,202,541 A 4/1993 Patterson
5,266,762 A 11/1993 Hoffman
5,305,970 A 4/1994 Porter et al.
5,459,996 A 10/1995 Malloy, III
5,511,748 A 4/1996 Scott
5,578,140 A 11/1996 Yogev
5,593,549 A 1/1997 Stirbl et al.
5,674,794 A 10/1997 Chatterjee
5,751,895 A 5/1998 Bridges
5,861,947 A 1/1999 Neumann
5,979,438 A 11/1999 Nakamura
5,982,481 A 11/1999 Stone
6,052,987 A 4/2000 Dressler
6,057,505 A 5/2000 Ortabasi
6,193,193 B1 2/2001 Sorrano
6,290,185 B1 9/2001 DeMars
6,343,464 B1 2/2002 Westerman
6,350,973 B2 2/2002 Wroe
6,532,953 B1 3/2003 Blackmon et al.
6,594,984 B1 7/2003 Kudija, Jr
6,669,148 B2 12/2003 Anderman et al.
6,742,325 B2 6/2004 Kudija, Jr
7,207,327 B2 4/2007 Litwin
7,387,279 B2 6/2008 Anderman et al.
7,575,200 B2 8/2009 Behrens et al.
7,594,530 B1 9/2009 Tucker
7,823,837 B2 11/2010 Behrens et al.
7,997,510 B2 8/2011 Pavia et al.
8,033,110 B2 10/2011 Gilon et al.
8,147,076 B2 4/2012 Ezawa
8,357,884 B1 1/2013 Ethridge
8,379,310 B2 2/2013 Mori et al.
8,733,706 B1 * 5/2014 Fernandez ............ B64G 1/623
244/158.7
9,010,317 B1 4/2015 Gross
9,187,191 B1 11/2015 Jensen et al.
9,222,702 B2 12/2015 Goldberg
9,266,627 B1 2/2016 Anderson
9,346,563 B1 5/2016 Martin
9,409,658 B1 8/2016 Diamandis et al.
9,581,021 B2 2/2017 Ethridge
9,676,499 B2 6/2017 Myers et al.
9,709,771 B2 7/2017 Corrigan
9,771,897 B2 9/2017 Soulier
10,654,596 B1 5/2020 Eller
10,919,227 B2 2/2021 Cook
10,989,443 B1 4/2021 Sercel et al.
11,085,669 B2 8/2021 Sercel
11,143,026 B2 10/2021 Sercel et al.
11,280,194 B2 3/2022 Sercel
11,292,620 B1 * 4/2022 Molony ............... B64G 1/1071
11,391,246 B2 7/2022 Sercel et al.
11,643,930 B2 5/2023 Sercel
12,025,006 B2 7/2024 Sercel
12,025,078 B2 7/2024 Sercel
12,203,371 B2 1/2025 Sercel
12,215,926 B2 2/2025 Small
2002/0075579 A1 6/2002 Vasylyev et al.
2002/0184873 A1 12/2002 Dujarric
2003/0029969 A1 2/2003 Turner
2003/0173469 A1 9/2003 Kudija et al.
2003/0224082 A1 12/2003 Akopyan
2004/0004184 A1 1/2004 Schubert
2004/0231716 A1 11/2004 Litwin
2006/0191916 A1 8/2006 Stephan et al.
2007/0128582 A1 6/2007 Anderson et al.
2008/0000232 A1 1/2008 Rogers et al.
2008/0023060 A1 1/2008 Grumazescu
2008/0134667 A1 6/2008 Pavia et al.
2008/0156315 A1 7/2008 Yangpichit
2009/0293448 A1 12/2009 Grote et al.
2010/0038491 A1 2/2010 Cepollina et al.
2010/0163683 A1 7/2010 Quine
2010/0252024 A1 10/2010 Convery
2010/0269817 A1 10/2010 Kelly
2010/0294261 A1 11/2010 Deforge
2010/0319678 A1 12/2010 Maemura et al.
2011/0031238 A1 2/2011 Segawa
2011/0041894 A1 2/2011 Liao
2011/0127382 A1 6/2011 Im
2011/0185728 A1 8/2011 Meyers et al.
2011/0220091 A1 9/2011 Kroyzer
2011/0315678 A1 12/2011 Furuya
2012/0155966 A1 6/2012 Zillmer
2013/0021471 A1 1/2013 Waterhouse
2013/0206209 A1 8/2013 Lasich
2013/0239952 A1 9/2013 Kroyzer
2014/0138952 A1 5/2014 Marumoto
2014/0150651 A1 6/2014 Velasco Valcke
2014/0151502 A1 * 6/2014 Kosheleff ............... B64F 1/007
244/114 R
2014/0174430 A1 6/2014 Fitzgerald et al.
2014/0261391 A1 9/2014 Taylor
2014/0262278 A1 9/2014 Walton
2014/0318127 A1 10/2014 Kerns
2015/0027102 A1 1/2015 Bahn et al.
2015/0180114 A1 6/2015 Achour
2016/0010442 A1 1/2016 Kearl
2016/0024921 A1 1/2016 Ethridge
2016/0075453 A1 3/2016 Sauzay et al.
2016/0076792 A1 3/2016 Magaldi
2016/0121395 A1 5/2016 Kawanaka
2017/0129579 A1 5/2017 De Jong
2018/0194626 A1 7/2018 Berggren et al.
2018/0238272 A1 8/2018 Renaud
2018/0265196 A1 * 9/2018 Phillips ..................... B64F 1/20
2018/0265224 A1 9/2018 Foulds et al.
2018/0298846 A1 10/2018 Anflo
2019/0217968 A1 * 7/2019 Schmidt .................... B64F 1/00
2019/0271228 A1 9/2019 Sowers, Jr. et al.
2019/0358570 A1 11/2019 Kiefer
2020/0055617 A1 2/2020 Grover
2020/0283174 A1 9/2020 Kokorich
2021/0061494 A1 3/2021 Belieres Montero
2021/0197987 A1 7/2021 Kokorich et al.
2021/0333019 A1 10/2021 Sercel et al.
2022/0024612 A1 1/2022 Sercel et al.
2022/0046612 A1 2/2022 Ma et al.
2022/0082019 A1 3/2022 Sercel et al.
2022/0089302 A1 3/2022 Sercel et al.
2022/0090500 A1 3/2022 Sercel
2022/0268524 A1 8/2022 Small
2022/0275721 A1 9/2022 Sercel
2022/0290635 A1 9/2022 Sercel
2023/0249848 A1 8/2023 Sercel
2023/0383650 A1 11/2023 Sercel

(56) References Cited

U.S. PATENT DOCUMENTS

| | | | |
|---|---|---|---|
| 2024/0159076 | A1 | 5/2024 | Sercel |
| 2024/0254010 | A1 | 8/2024 | Kamen |
| 2024/0328674 | A1 | 10/2024 | Sercel |
| 2025/0052211 | A1 | 2/2025 | Sercel |
| 2025/0092785 | A1 | 3/2025 | Sercel |

FOREIGN PATENT DOCUMENTS

| | | |
|---|---|---|
| DE | 10350734 | 3/2005 |
| DE | 102004026517 B3 | 10/2005 |
| EP | 2 177 846 | 4/2010 |
| EP | 2 195 583 | 3/2013 |
| ES | 2639583 | 10/2017 |
| GB | 1481234 | 7/1977 |
| JP | 2012-038954 | 2/2012 |
| JP | 2019-148155 | 9/2019 |
| RU | 2344973 | 1/2009 |
| RU | 02353775 | 4/2009 |
| WO | WO 16/172647 | 10/2016 |
| WO | WO 20/033561 | 2/2020 |

OTHER PUBLICATIONS

Alternative Scenarios Utilizing Nonterrestrial Resources Charles H. Eldred and Barney B. Roberts, Space Resources Scenarios NASA 1992.

Antarctic Meteorite Sample, Investigator's Guidebook, Astromaterials Research and Exploration Science Directorate KA, Astromaterials Acquisition and Curation Office/KT, JSC-66468, Lyndon B. Johnson Space Center, Houston TX.

Arnold, J.R., "Ice in the lunar polar regions", J. Geophys. Res 84., 1979, pp. 5659-5668.

Badescu, V., "Asteroids: Prospective Energy and Material Resources," Jul. 14, 2013, ISBN-13:978-3642392438.

Binzel, R., "Human Spaceflight: Find Asteroids to get to Mars." Nature 514, 559-561, Oct. 29, 2014.

Bliss, T., et al. "Experimental validation of robust resonance entrainment for cpg-controlled tensegrity structures." IEEE Transactions on Control Systems Technology, 2012, vol. 21(3), pp. 666-678.

Bottke, W.F., et al., Debiased orbital and Absolute Magnitude Distribution of the near-Earth objects, Icarus 156, 399-433, 2002.

Bowersox, Kenneth and NASA Advisory Council Committee on Human Exploration and Operations, "NASA Advisory Council Finding on NASA Human Exploration Strategy," from the Council Public Deliberation, Jul. 31, 2014.

Boyle, A., "Blue Origin Space venture slips in a sneak peek at design of Blue Moon lunar lander", Apr. 5, 2017, https://www.geekwire.com/2017/blue-origin-sneak-peek-blue-moon-lunar-lander/.

Boyle, A., "Jeff Bezos lays out his vision for city on the moon, complete with robots", May 20, 2017,https://www.geekwire.com/2017/jeff-bezos-blue-origin-moon/.

Brophy, J., et al., "Spacecraft Conceptual Design for Returning Entire Near-Earth Asteroids," 48th AIAA/ASME/SAE/ASEE Joint Propulsion Conference & Exhibit and 10th International Energy Conversion Engineering Conference, Atlanta, George Jul. 29-Aug. 1, 2012.

Brown, P., et al., The Flux of small near-Earth objects colliding with the Earth, Nature 420, 294-296, 2002.

Bussey, D. B. J., et al., "Permanent shadow in simple craters near the lunar poles," Geophysical Research Letters, 2003, vol. 30, No. 6, 1278, pp. 11-1-11-4.

Cassapakis, C.G., et al., "A Power Antenna for Deep Space Missions," Solar Engineering Editors: J.H. Davidson and J. Chavez. Book No. HO1046, 1996.

Ceruti, Conceptual Design and Preliminary Structural Analysis of Inflatable Basket for an Asteroid Capturing Satellite; Strojniki vestnik—Journal of Mechanical Engineering 61(2015)5, 341-351 © 2015 Journal of Mechanical Engineering; DOI: 10.5545/sv-jme.2014.2063; in 11 pages.

Chen, L.H., et al., Soft spherical tensegrity robot design using rod-centered actuation and control, Journal of Mechanisms and Robotics, 2017, vol. 9(2) pp. 025001.

Chen, M., et al., "Energy analysis of growth adaptable artificial gravity space habitat," AIAA Space and Astronautics Forum and Exposition, 2018, in 13 pages.

Cohen, Marc M., et al, "Asteroid Mining," AIAA 2013-5304, presented at AIAA Space 2013 Conference and Exposition, Sep. 10-12, 2013, San Diego, CA.

Colaprete, A., et al., "Detection of water in the Icross ejecta plume," Science, vol. 330, pp. 463-468, Oct. 22, 2010.

Court, R.W., et al. "Volatile Yields upon Pyrolysis of Carbonaceous Chondrites as Determined by Quantitative Pyrolysis-Fourier Transform Infrared Spectroscopy" presented at the 40th Lunar and Planetary Science Conference, 2009.

Craft, J., et al. "Percussive digging systems for planetary research" IEEE Aerospace and Electronic Systems Magazine, 2010, vol. 25 pp. 21-26.

Crawford, I.A., Lunar resources: A review. Progress in Physical Geography, 39(2):137-167, 2015.

Crusan, J., "an Evolvable Mars Campaign" NASA Presentation, Jul. 2014, available at https:/www.nasa.gov/sites/default/files/files/20140429-Crusan-Evolvable-Mars-Campaign.pdf.

David, "Asteroid-Mining Plan Would Bake Water Out of Bagged-Up Space Rocks." Space.com, Sep. 18, 2015 (Sep. 18, 2015), pp. 1-5 [online] <URL: http://www.space.com/30582-asteroid-mining-water-propulsion.html>.

Duke, M., et al., "Mining of lunar polar ice", 36th AIAA Aerospace Sciences Meeting and Exhibit, 1998, pp. 1069.

Ehricke, K.A., "The Solar-Powered Space Ship," ARS Paper 310-56, Jun. 1956.

Erickson, K., "Optimal Architecture for an Asteroid Mining Mission: Equipment Details and Integration" Collection of Technical Papers—Space Conference 2006, Sep. 19-21, 2006, San Jose, California; AIAA 2006-7504; in 17 pages.

Ethridge, E. C., et al., "Microwave Extraction of Volatiles for Mars Science and ISRU. Concepts and Approaches for Mars Exploration". Concepts and Approaches for Mars Exploration; Jun. 2012, pp. 2-14, Houston, TX; United States.

FAA 2012 Commercial Space Transportation Forecasts. Available at http://www.faa.gov/about/office_org/headquarters_offices/ast/media/The_Annual_Compendium_of_Commercial_Space_Transporation_2012.pdf.

Fabbrocino, F., et al., "Optimal prestress design of composite cable-stayed bridges". Composite Structures, 2017, vol. 169, pp. 167-172.

Feldman, W. C., et al., (1998). "Fluxes of fast and epithermal neutrons from Lunar Prospector", Evidence for water ice at the lunar poles, science 281, 1998, pp. 1496-1500.

Fincannon, J., "Lunar Polar Illumination for Power Analysis", NASA/TM, 2008-215446, https://ntrs.nasa.gov/archive/nasa/casi.ntrs.nasa.gov/20080045536.pdf.

Fisher, E.A., et al., "Evidence for surface water ice in the lunar polar regions using reflectance measurements from the Lunar Orbiter Laser Altimeter and temperature measurements from the Diviner Lunar Radiometer Experiment", Lunar Polar Volaties, 2018, LBI Contrib. No. 2087.

Fisher, E.A., et al., "Evidence for surface water ice in the lunar polar regions using reflectance measurements from the Lunar Orbiter Laser Altimeter and temperature measurements from the Diviner Lunar Radiometer Experiment", Icarus 292, 2017, pp. 74.

Freeland, R.E., et al., "Large Inflatable Deployable Antenna Flight Experiment Results," (AF Paper 97-1.3.01, presented at the 48th Congress of the International Astronautical Federation, Turin, Italy, Oct. 6-10, 1997.

Freeland, R.E., et al., "Significance of the Inflatable Antenna Experiment Technology", AIAA-98-2104 published in the 39th AIAA/ASME/ASCE/AHS/ASC Structures, Structural Dynamics, and Materials Conference and Exhibit, Apr. 1998.

Garenne, A.B., et al, "The Abundance and Stability of Water in Type 1 and 2 Carbonaceous Chondrites," CI, CM, and CRI Geochimica et Cosmochimica Acta 137, 93-112, 2014.

(56) References Cited

OTHER PUBLICATIONS

Gertsch, L.S., et al., Laboratory Demonstration and Test of Solar Thermal Asteroid ISRU, funded NASA Early Stage Innovations Space Tech Research Grants, Proposed 2014, funded Jan. 2015.
Gertsch, R.E., et al, "Near Earth Resources," In Near Earth Objects, Annals of the New York Academy of Science, vol. 822, p. 468-510, 1997.
Gertsch, R.E., et al., "Mining near Earth resources," In Near Earth Objects, Annals of the New York Academy of Sciences, vol. 822, p. 511-537, 1997.
Gläser, P., et al., "Illumination conditions at the lunar poles: Implications for future exploration". Planetary and Space Science, in press, 2017, https://doi.org/10.1016/j.pss. 2017.07.006.
Goyal, R., et al., "Analytical study of tensegrity lattices for mass-efficient mechanical energy absorption", International Journal of Space Structures, 2018.
Goyal, R., et al., "Modeling of tensegrity structures", Journal of Open Source Software, 2019, vol. 4(42), pp. 1613.
Goyal, R., et al., "Tensegrity system dynamics with rigid bars and massive strings", Multibody System Dynamics, 2019, vol. 46(3) pp. 203-228.
Granvik et al., Abstract, IAU-Symposium: Complex Planetary Systems, Jul. 7-11, 2014, Namur, Belgium.
Granvik, M., et al., "The population of natural Earth satellites," Icarus, 2012.
Grip; Modeling and Simulation of Asteroid Capture Using a Deformable Membrane Capture Device; Proceedings of the ASME 2015 International Design Engineering Technical Conferences & Computers and Information in Engineering Conference; IDETC/CIE 2015; Aug. 2-5, 2015; Boston, USA; In 10 pages.
Grossman, G., et al, "Inflatable Concentrators for Solar Propulsion and Dynamic Space Power." Journal of Solar Energy Engineering, Nov. 1990, vol. 112/229.
Harwood, William, "NASA's proposed asteroid retrieval mission outlined." Posted in Space Flight Now: Apr. 6, 2013. Available at https://spaceflightnow.com/news/n1304/06asteroid/.
Hayne, P. O., et al., "Evidence for exposed water ice in the Moon's south polar regions from Lunar Reconnaissance Orbiter ultraviolet albedo and temperature measurements". Icarus, 2015, vol. 255, pp. 58-69.
Hayne, P.O., et al., "Diviner Lunar Radiometer Observations of the LCROSS Impact", Science 330, 2010, pp. 477.
Heiken, G.H., et al., "Lunar sourcebook-a user's guide to the moon". NASA,. Cambridge, England, Cambridge University Press, 1991, vol. 753, pp No individual items are abstracted in this volume.
Interbartolo III. Michael A, et al., "Prototype Development of an Integrated Mars Atmosphere and Soil-Processing System", Journal of Aerospace Engineering, Jan. 2013, vol. 26(1), pp. 57-66.
Kutter, Bernard, "Transportation and Propellant Resources in the Cislunar Economy", Space Resources Roundtable XIX Planetary & Terrestrial Mining Sciences Symposium. http://www.isruinfo.com/index.php?page=srr_19_ptmss, 2018.
Lawrence, D. J., et al., "Evidence for water ice near Mercury's north pole from messenger Neutron Spectrometer measurements". Science 339, 2013, pp. 292-296.
Lewis, J.A., "Logistical Implications of Water Extraction from Near-Earth Asteroids," Proceedings of the Eleventh SSI-Princeton Conference, May 12-15, 1993.
Lewis, J.A., "Hard Choices for Manned Spaceflight: America as Icarus", http://csis.org/files/publication/140508_Lewis_HardChoicesMannedSpaceflight_Web.pdf, 2014.
Lewis; Mining the Sky; Untold Riches from the Asteroids, Comets, and Planets; Library of Congress Cataloging-in-Publication Data; ISBN 0-201-47959-1; 1996; 66 pages (pp. 7-11, 32, 49-74, 108-127, 134-141, 198-200).
Li, S. et al., "Possible detection of surface water ice in the lunar polar regions using data from the Moon Mineralogy Mapper (M3)," presented at LPSC XLVIII, Mar. 2017, Houston, TX.
Lunar Exploration Advisory Group "Commercial Lunar Propellant Architecture a Collaborative Study of Lunar Propellant Production", Final Report. Aug. 2018.
Masten, Jun. 17, 2021, Break the ice: Masten designs rocket mining system to extract lunar water, blog, 8 pp.
Mazanek et al., "Asteroid Retrieval Mission Concept - Trailblazing Our Future in Space and Helping to Protect Us from Earth Impactors." Planetary Defense Conference 2013, pp. 3, 5 [online] <URL: http://ntrs.nasa.gov/archive/nasa/casi.ntrs.nasa.gov/20130013170.pdf>.
Mazarico, E., et al., "Illumination Conditions of the Lunar Polar Regions Using LOLA Topography." Icarus, vol. 211, No. 2, 2011, pp. 1066-1081., doi: 10.1016/j.icarus. 2010.10.030.
Mommert, M., et al, "Constraining the Physical Properties of Near-Earth Object 2009 BD," The Astrophysical Journal, vol. 786, No. 2.
Nagase, K., et al., "Minimal mass tensegrity structures", The International Association for Shell and Spatial Structures, 2014, vol. 55(1), pp. 37-48.
NASA Report from Office of the Chief Technologist, Emerging Space: The Evolving Landscape of 21st Century American Spaceflight, http://images.spaceref.com/docs/ 2014/Emerging_Space_Report.pdf.
NASA, "Asteroid Redirect Mission Reference Concept," 2013.
Norton, B., "Harnessing Solar Heat," Springer, pages C1-xiii, 39 and 48-73, ISBN 978-007-7275-5, 2013.
Pike R.J., "Crater dimensions from Apollo data and supplemental sources". The Moon, 1976, vol. 15, pp. 463-477.
Pike, R.J., "Depth/diameter relations of fresh lunar craters: Revision from spacecraft data", Geophysical Research Letters, 1974, vol. 1(7), pp. 291-294.
Rapp, D., "Use of Extraterrestrial Resources for Human Space Missions to Moon or Mars (Springer Praxis Books / Astronautical Engineering)" published Nov. 20, 2012.
Reinhold; A Solar Powered Station at a Lunar Pole; Feb. 18, 2021; https://theworld.com/~reinhold/lunarpolar.html; 7 pages.
Rimoli, J.J., et al., "Mechanical response of 3-dimensional tensegrity lattices", Composites Part B: Engineering, 2017, vol. 115, pp. 30-42.
Ross, Shane D., "Near-Earth Asteroid Mining", Caltech Space Industry Report, Dec. 14, 2001, Control and Dynamical Systems Caltech 107-81, Pasadena CA 91125 available at http://www2.esm.vt.edu/-sdross/papers/ross-asteroid-mining-2001.pdf.
Rostami, J., et al., "Lunar tunnel boring machines", In Earth and Space 2018: Engineering for Extreme Environments, American Society of Civil Engineers, pp. 240-252, 2018, Reston, VA.
Sabelhaus, A.P., et al. "Model-predictive control of a flexible spine robot", American Control Conference, 2017, IEEE, pp. 5051-5057.
Sanders, Oct. 10, 2019, NASA Lunar ISRU Strategy, presented at the What Next for Space Resource Utilization? Workshop, Luxembourg, 20 pp.
Schlaich, M., "The messeturm in Rostock—A tensegrity tower", Journal of the International Association for Shell and Spatial Structures, 2004, vol. 45(2), pp. 93-98.
Sercel, "Demonstration of "Optical Mining" For Excavation of Asteroids and Production of Mission Consumables." NASA SBIR. Apr. 23, 7015 (Apr. 23, 2015), pp. 1-2, [online] <URL: http://sbir.nasa.gov/SBIR/abstracts/15/sbir/phase1/SBIR-15-1-H1 .01-9278.html>.
Sercel, J.C., "Solar Thermal Propulsion for Planetary Spacecraft", presented at the JANNAF Propulsion Conference, San Diego, CA, Apr. 9-12, 1985.
Sercel, J.C., et al., "APIS(Asteroid Provided in-Situ Supplies): 100MT of Water, One Falcon 9 Launch" NIAC Phase 1a proposal submitted Nov. 2014.
Sercel, J.C., et al., "Emerging Space Office Grant (ESO)", "Stepping Stones: Economic Benefits of Asteroid Mining for Exploration of Deep Space" NASA Report, Contract No. NNX16AH11G, 2017.
Sercel, Apr. 22, 2015, Worker Bees: thin-film solar thermal technology enables water-based cis-lunar transportation architecture, ICS Associates Inc., 109 pp.

(56) References Cited

OTHER PUBLICATIONS

Sercel; Time Dependent Finite Difference Modeling of Outgassing of Asteroids via Bulk Heating; 978-1-5386-2014-4/18/$31.00 ©2018 IEEE; I 14 pages.
Skelton, R.E., Tensegrity Systems, 2009, Springer US.
Sowers et al., 2019, Ice mining in lunar permanently shadowed regions, New Space, 7(4):235-244.
Sowers, Jun. 12, 2018, Closing the Business Case for Lunar Propellant, PowerPoint presentation, 13 pp.
Spudis, P., et al., "Evidence for water ice on the moon: Results for anomalous polar craters from the lro mini-rf imaging radar", Journal of Geophysical Research: Planets, 2013, vol. 118(10), pp. 2016-2029.
Squyres, S. and the NASA Advisory Council, Recommendation Regarding Mismatch Between NASA's Aspirations for Human Space Flight and Its Budget, from the Council Public Deliberation, Jul. 31, 2014.
Staugaitis, C., et al., "Mechanical and Physical Properties of the Echo II Metal-Polymer Laminate (NASA TND-3409)," NASA Goddard Space Flight Center, 1966.
Stoica, A. et al., "TransFormers of Extreme Environments and Their Integration in a Solar Power Infrastructure". AIAA Space 2016, AIAA Space Forum, 2016.
Stoica, A. et al., NIAC Phase II Final Report, Early Stage Innovation, NASA Innovative Advanced Concepts (NIAC), "TransFormers for Lunar Extreme Environments: Ensuring Long-Term Operations in Regions of Darkness and Low Temperatures", Nov. 2017.
Sultan, C., et al, "Deployment of tensegrity structures", International Journal of Solids and Structures, 2003, vol. 40(18), pp. 4637-4657.
Sunspiral, V., et al, "Tensegrity based probes for planetary exploration: Entry, descent and landing (edl) and surface mobility analysis", International Journal of Planetary Probes, 2013, vol. 7, pp. 13.
Taylor, G.J., "Using the Resources of the Moon to Expand Earth's Economic Sphere." Planetary|Science Research Discoveries Report (2019): E205. Nov. 14, 2019 http://www.psrd.hawaii.edu/Nov19/PSRD-lunar-isru.pdf.
Thomas, M. et al., "Scaling Characteristics of Inflatable Paraboloid Concentrators", Presented at the Second ASME-JSES-JSME International Solar Energy Conference, Reno, Nevada, Mar. 17-22, 1991.
Tukkaraja, P., et al. Lunar mining and processing for in situ resource utilization, Earth and Space 2018: Engineering for Extreme Environments, American Society of Civil Engineers, 2018, pp. 401-413, Reston, VA.
Vasavada, A. R., et al., "Near-Surface Temperatures on Mercury and the Moon and the Stability of Polar Ice Deposits". Icarus, 1999, vol. 141, pp. 179-193.
Wihite, Alan, et al., Evolved Human Space Exploration Architecture Using Commercial Launch/Propellant Depots, 63rd International Astronautical Congress, Naples, Italy, 2012.
Yildiz, K., et al, "Effective beam stiffness properties of n-strut cylindrical tensegrity towers", AIAA Journal, 2019, vol. 57(5), pp. 2185-2194.
Yildiz, K., et al., "A novel deployment strategy for tensegrity towers", AIAA Spacecraft Structures Conference, 2018, pp. 0693.
Zacny; Asteroid Mining; AIAA Space 2013 Conference and Exposition Sep. 10-12, 2013, San Diego, CA; AIAA 2013-5304; in 16 pages.
Zegler, Frank, et al., "Evolving to a Depot-Based Space Transportation Architecture" AIAA Space 2010 Conference and Exposition. Aug. 30-Sep. 2, 2010, Anaheim, CA, AIAA 2010-8638.
Antenna-theory.com, 2015, https://antenna-theory.com/antennas/dipole.php 7/7, The dipole antenna, accessed Aug. 10, 2023.
Antenna-theory.com, 2015, https://www.antenna-theory.com/tutorial/txline/transmissionline.php, Introduction to transmission lines, accessed Aug. 10, 2023.
Bradford et al., Jul. 9, 2001, Fresnel concentrators for space solar power and solar thermal propulsion: final report, United Applied Technologies, Inc., 22 pp.
Stewart et al., Sep. 1996, Dual fuel solar thermal stage—ideal analysis, Journal of Spacecraft and Rockets, 33(5):752-754.
Ulas et al., 2013, Numerical analysis of regenerative cooling in liquid propellant rocket engines, Aerospace Science and Technology 24(1):187-197.

* cited by examiner

DEPLOYABLE LUNAR LANDING PADS FOR SPACE MINING APPLICATIONS

INCORPORATION BY REFERENCE TO ANY PRIORITY APPLICATION(S)

This application is based upon and claims the benefit of priority from U.S. Provisional Patent Application No. 63/152,868 filed on Jan. 28, 2021. Moreover, any and all applications for which a foreign or domestic priority claim is identified in the Application Data Sheet as filed with the present application are hereby incorporated by reference under 37 CFR 1.57. The entire contents of each of the above-listed item(s) is hereby incorporated into this document by reference and made a part of this specification for all purposes, for all that each contains.

BACKGROUND

Technological Field

The present system relates to preparing rocket landing sites on the Moon or other celestial bodies mitigate or address dangers from loose surface materials.

SUMMARY OF CERTAIN INVENTIVE ASPECTS

Problem

When a spacecraft performs a soft landing on the Moon or another celestial body, it must use a downward-directed braking rocket to reduce its touchdown speed. Near the lunar surface, the powerful exhaust from the rocket plume causes loose material on the surface to be blown away in all possible directions at very high speed. In this minimal gravity and atmosphere environment, small particles, grains of sand and loose gravel can be propelled at speeds up to several thousands of meters per second. These speeds may be two to three times faster than a typical rifle bullet fired on Earth. Nearby structures are at risk of penetration damage due to the high-speed particles colliding with such structures.

With the absence of air friction and the low lunar gravity, particles become projectiles that often blast high above the ground, only to return later at extreme speeds and energy. Some particles can be propelled into lunar orbit and may circle the entire Moon before again striking the lunar surface. These high-speed particles can present a serious damage hazard to near or distant man-made structures previously landed and/or constructed on the Moon. The problem is particularly dangerous for landers that touch down near the lunar poles. Due to the low rotational velocity of the polar regions, the particles have a high probability of striking very near to their launch points. They may ultimately strike the lander which launched them as well as any nearby structures, even if the lander or nearby structures are not hit by the initial launch of the particles.

A method is needed to provide landing pads or other structures for incoming spacecraft that will be free from loose surface materials and/or can significantly reduce the dispersion or propelling of lunar particles during launch/take off. Eventually, lunar surface operations will be able to construct paved spaceports from available lunar materials. For early landers and for landing in previously unexplored regions, it is desirable to deploy landing pads directly from incoming space assets.

While other methods of deploying a landing pad from a spacecraft have been proposed, none are intended for multiple landings and very few are deployed prior to landing. One is the Masten FAST technology, which is a spray injected into the lander's exhaust to form a coating that traps any loose surface material beneath it. Another is the PocketPad, which is a large piece of fabric surrounded by an inflatable ring. These methods are not intended to survive repeated landings. A mobile helipad, the Mobi-mat TAHEL product line, uses a heavy fabric to prevent loose surface material from being blown into the air. However, TAHEL mobile helipads are deployed by a ground crew before helicopters attempt to land. A disadvantage of the Masten approach and some other approaches is that it requires the landing spacecraft to hover while the pad is deployed. Other concepts require at least one vehicle to be landed to deploy pads for subsequent landers.

Described herein is an approach in which a self-contained landing pad system is deployed either from the spacecraft which is to land, or from another spacecraft prior to the landing event. According to certain aspects, a landing pad described herein contains rocket motors or other landing technology that allows it to land itself without support from the landing spacecraft. Once landed on the ground, the landing pad can deploy a flat structure for the landing spacecraft to use. The landing pad can be deployed many orbits before the landing spacecraft or shortly before the landing spacecraft or even while the landing spacecraft is hovering or descending, but this is not required.

DETAILED DESCRIPTION

The present system describes methods and implementations to provide for safe landing pads on the lunar surface or on the surface of another celestial body. In the descriptions below, the landing pad is described as made from a large continuous membrane or large closely woven blanket of relatively low-density material that can be unfurled from a spacecraft. In other implementations, the landing pad can also be made of hinged and/or motorized flat plates made of metal and/or ceramic that are made to automatically unfurl and/or fold out after the landing pad has landed.

Figure 1:
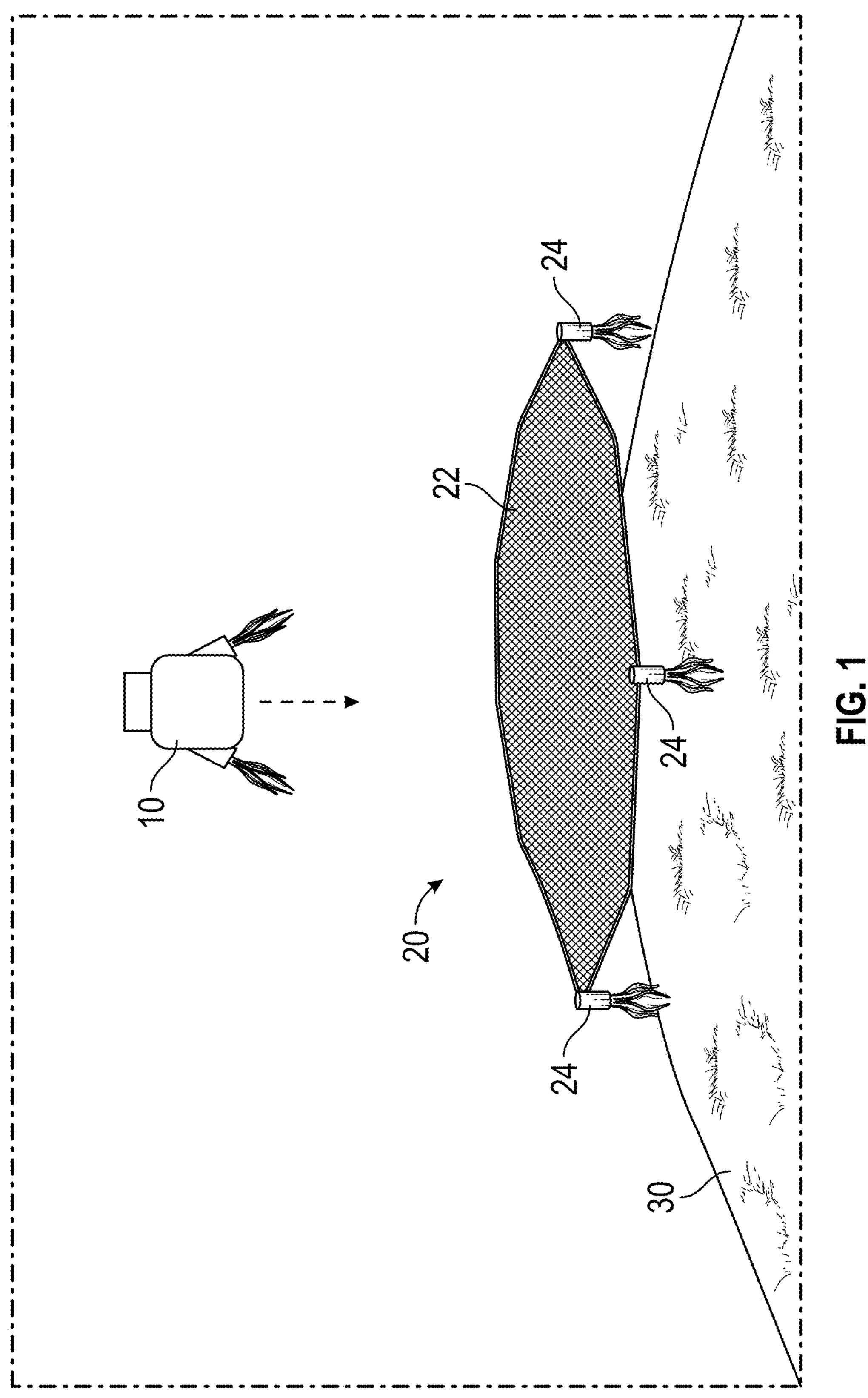
FIG. 1 illustrates a spacecraft which deploys a flexible landing pad toward the lunar surface prior to its touchdown.

FIG. 1 illustrates an approaching spacecraft 10 configured to deploy a flexible or rigid landing pad 20 with a deployable surface 22 toward the lunar surface 30 prior to touchdown. Depending on the embodiment, the deployable surface 22 may be flexible, rigid, or have a combination of flexible and rigid parts.

The landing pad 20 can include braking thrusters 24 configured to slow the landing pad's descent. The braking thrusters 24 may be relatively small to prevent launching lunar particles when a sufficient distance from the lunar surface 30. In other words, the amount of thrust provided by the braking thrusters 24 is configured to be small enough to reduce or prevent launching lunar particles when further away from the lunar surface than a threshold distance. The braking thrusters 24 are configured to shut down a threshold distance (e.g., several meters) above the lunar surface 30 to prevent or reduce the amount of loose material scattered by the braking thruster's 24 exhaust plumes. The main spacecraft 10 can then land normally on the landing pad 20, which reduces debris scattered from the more powerful rocket plume. That is, the deployed surface 22 of the landing pad 20 can block, absorb, or receive at least a portion of the rocket plume from the spacecraft 20, thereby reducing or eliminating scattering of debris that would result if the landing pad 20 were not present. The spacecraft 10 can also launch from the landing pad 20 back into space and other spacecraft can subsequently use the landing pad 20 in the same or a similar way to reduce or eliminate the scattering of lunar debris.

Figure 2:
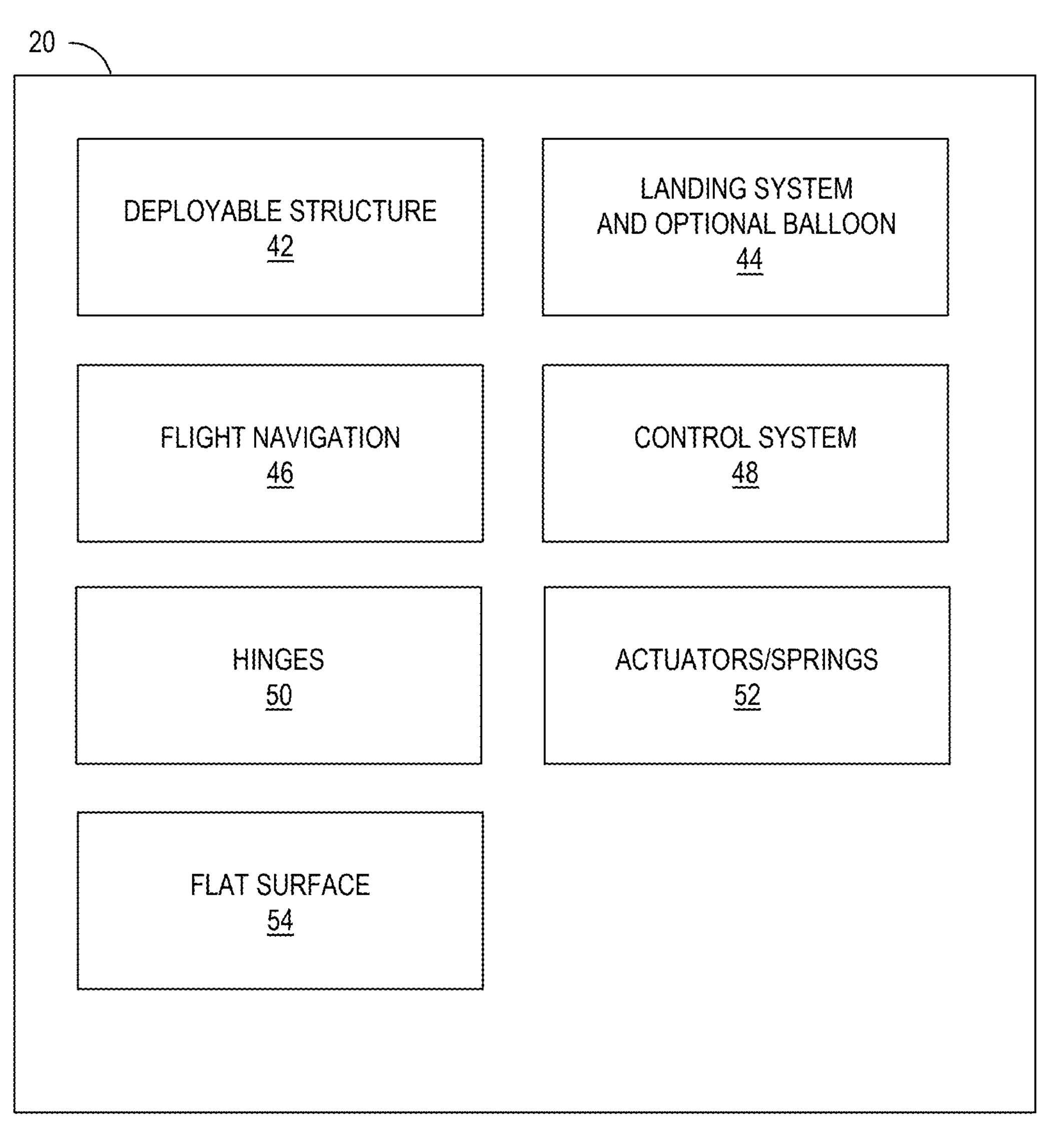
FIG. 2 is a block diagram illustrating a landing pad 20 in accordance with aspects of this disclosure.

FIG. 2 is a block diagram illustrating a landing pad 20 in accordance with aspects of this disclosure. In the illustrated embodiment, the landing pad 20 comprises a deployable structure 42 including a landing system 44 (e.g., one or more rocket engines) as well as a flight navigation system 46 and a control system 48. Prior to deployment from the spacecraft 10, the deployable structure 42 is configured to start off in a stowed configuration. The landing pad 20 can be launched, ejected, or unfurled from the spacecraft 10 in the stowed configuration. The rocket engines, or other landing system 44, can be configured to land the landing pad 20 onto the surface in the stowed configuration. After landing, the landing pad 20 can be deployed/unfolded into the landing pad 20 full size. Alternatively, a descending or landing movement (e.g., resistance from ground impact, etc.) can be used to overcome spring tension or otherwise help expand or otherwise deploy the pad. To aid in deployment, the landing pad 20 can include hinges 50 driven by actuators and/or springs 52 configured to unfold the landing pad 20. The unfolding of the landing pad 20 may have a simple unfolding pattern (e.g., like flower pedals opening) or a comparatively more complex unfolding pattern (e.g., like unfolding an origami pattern). The landing pad 20 can include flat surfaces 54 between the hinges 50, which can be formed of rigid metallic, ceramic or other types of panels, or can be formed of more exotic fabrics or shape memory materials in some implementations.

In a first embodiment, a landing pad 20 is deployed from a spacecraft 10 above the lunar surface 30. The spacecraft 10 may be on a direct path towards the lunar surface 30 or the spacecraft 10 may be on a passing orbit. The landing pad 30 is unfurled from a stowed position on the spacecraft 10 by any of several means either before landing on the lunar surface 30 or thereafter. In some implementations of the first embodiment, the landing pad 20 can be caused to rotate and centrifugal forces are used to spread out the deployable surface 22 of the landing pad 20 into a deployed configuration. In some implementations, the landing pad 20 can include shape memory materials imbedded therein, which are configured to cause the deployable surface 22 of the landing pad 20 to spread out after the landing pad 20 is released from storage. In some implementations, thrusters (e.g., similar to the braking thrusters 24) disposed around the circumference of the landing pad 20 are configured to provide forces to unfurl the pad material forming the deployable surface 22 of the landing pad 20. In some implementations, a ground impact force is used to reconfigure a landing pad (e.g., similar to an umbrella, where ground impact is used to extend radial struts, with or without the aid of a spring).

Continuing to refer to the first embodiment, when the spacecraft 10 is on a direct path towards the lunar surface 30, the deployed landing pad 20 can be released directly from the spacecraft 10. The landing pad 20 can then proceed directly to a touch down area on the lunar surface 30 where the landing pad 20 will impact with more or less velocity (e.g., depending on the initial velocity of the landing pad 20 at release and its altitude or distance of fall to the lunar surface 30). In some embodiments, the landing pad 20 is constructed of material with sufficiently low density such that the impact forces over each unit area of the landing pad 20 material may be quite low compared to the impact forces of the spacecraft 10. The landing of the landing pad 20 may be analogous to dropping a feather or a silk fabric onto a rough surface. The landing pad 20 may be decelerated by means of attached braking thrusters 24. When the landing pad 20 is a distance (e.g., a predetermined or sensed distance) above the lunar surface 30, the braking thrusters 24 may be configured to shut down or otherwise adjust to reduce or prevent scattering of loose surface material due to braking thrusters 24. Through the final approach (e.g., the last few meters or another predetermined distance) above the lunar surface 30, the landing pad 20 may fall freely in the relatively low lunar gravity.

In some embodiments, after release of the landing pad 20, the spacecraft 10 and the landing pad use active measures (e.g., thrusters or other mass displacement techniques) to change their relative positions, speeds, alignment, and/or orientations such that the landing pad 20 arrives at the surface 30 a sufficient time before the spacecraft 10. For example, the spacecraft 10 may decelerate, and/or the landing pad may temporarily accelerate, to cause separation between the spacecraft 10 and the landing pad 20. For example, after a spacecraft can eject a landing pad, then decelerate by firing braking rockets while the landing pad continues to descend. A certain time later (e.g., a few seconds later), the spacecraft 10 can fire braking rockets in a pattern such that the spacecraft 10 lands softly on the previously-landed landing pad 20.

In the case where the spacecraft 10 is in a passing orbit over the surface 30 of the Moon (in contrast to a more vertical or orthogonal descent, for example), the unfurled landing pad 20 can be provided with braking and/or orienting rockets 24 to reduce its tangential velocity over the lunar surface and/or re-orient itself with respect to the local surface. The landing pad 20 can then fall directly toward the surface 30 as in the process described above.

In some embodiments, the landing pad 20 is deployed from a spacecraft 10 after the spacecraft 10 has completed a landing on the surface 30 of the Moon. In some situations, it is expected that much loose material will be blown away during the landing of the spacecraft 10. The landing pad 20 can be used to prepare the landing site (or additional, e.g., adjacent, sites) for future spacecraft landing events.

In some implementations, the landing pad 20 and the deployment mechanism of the landing pad 20 may be packaged as a deployable payload from a multi-purpose spacecraft mission. Before or after landing, the payload can be detached from the spacecraft lander and mechanisms in the payload can be used to deploy the landing pad 10. In some implementations, the landing pad can be packaged for separate impact using a deployable or static balloon or other cushion or bumper.

In some implementations, the spacecraft 10 is a specialized lander dedicated to a single mission to deliver and deploy the landing pad 20. Upon landing, the lander can proceed directly to the task of deploying the landing pad 20. For example, the lander can comprise or transform into the landing pad, such that a first spacecraft becomes a landing pad for a second (and potentially additional) spacecraft.

The particular landing systems 44 used for the landing pad 20 may be selected based on a variety of factors, including the atmosphere and gravity of the celestial body onto which the landing pad 20 is designed to be deployed. For example, on celestial bodies having a significant atmosphere, a parachute type landing system 44 may be used to slow the decent of the landing pad 20 to speeds that will not damage the landing pad 20 when released from the spacecraft in orbit or high above the surface. As another example, when the gravity of the celestial body is low enough, the landing pad 20 may employ a landing system 44 can simply include a balloon, cushion, and/or bumper without the need for more sophisticated landing gear.

Another embodiment of a landing pad includes a large weight-bearing platform, such as an inflatable structure. As described herein, spacecraft which land or depart from the lunar surface or from the surface of asteroids are known to disperse high-speed sand and gravel particles in various directions due to blast from rocket engines or other propulsion systems. Blasted or dispersed surface ejecta can reach high velocities in low gravity and/or thin atmosphere conditions such as that of Earth's moon (e.g., above 1000 m/s). The ejecta can damage nearby and even distant facilities. A suggested mitigation method is to require that routine spacecraft operations be conducted only from prepared landing fields or other landing structures. Elevating, erecting, inflating, or widening a landing pad, e.g. an inflatable structure, can block or deter powerful rocket plumes from disturbing underlying surface regolith. Thus, a landing pad or inflatable structure that will shield surface regolith can be constructed without the need to pave, clear, or otherwise modify large areas of the lunar surface. Accordingly, in certain embodiments, a landing pad for spacecraft can be advantageously located on an inflatable structure (e.g., at the top of an inflatable tower, far above the underlying regolith) in order to reduce or eliminate the generation of ejecta during spacecraft landing/liftoff. Special materials can be used on or near the surface (or to form, coat, or otherwise protect the top layer of an inflatable) to avoid melting and other harmful effects. For example, a top plate on an inflatable structure such as a tower can be large and formed from relatively smooth, sturdy and/or inflammable materials. Additional details on inflatable structures and how to use and erect them in a moon-type environment are disclosed in U.S. patent application Ser. No. 17/574,462, filed Jan. 12, 2022, the entire disclosure of which is incorporated herein for all purposes, for all that it contains.

Example Methods of Landing a Landing Pad

The landing pad 20 may use various different methods or techniques for landing on a surface of a celestial body (e.g., such as the lunar surface). A non-exhaustive list of example methods and steps are provided below. A method of deploying a landing pad can include: deploying the landing pad from a spacecraft before the spacecraft reaches a surface of a celestial body; deploying a deployable surface of the landing pad on the surface of the celestial body, the deployable surface configured to cover and contain or immobilize loose material from the surface of the celestial body before and/or during arrival of the spacecraft.

The deployment of the deployable surface is performed before or as the landing pad arrives at the surface of the celestial body.

The deployment of the deployable surface is performed after the landing pad arrives at the surface of the celestial body.

The deployable surface is formed of a flexible membrane and/or fabric (e.g., a tightly woven fabric).

The deployment of the deployable surface comprises unfolding or unfurling the deployable surface. The deployment can occur, for example, by rotating the deployable surface to generate centrifugal forces after detaching the landing pad from the spacecraft.

The deployment can occur using a spring or jolt-initiated movement, as supporting arms extend using the force of impact as a directional energy source.

The deployment of the deployable surface comprises unfurling the deployable surface using one or more shape memory materials.

The deployment of the deployable surface comprises unfurling the deployable surface using one or more thrusters. These thrusters can be disposed about the circumference of the deployable surface, for example.

The method further includes decelerating and/or orienting the landing pad before touchdown using one or more braking thrusters.

The method further includes shutting down or adjusting power or direction of the braking thrusters a above the surface of the celestial body to allow the landing pad to descend (e.g., in free-fall) under gravity of the celestial body.

The deployable surface can be formed of a polymer liquid configured to harden upon contact with the lunar surface and bind to and immobilize loose surface material.

Some methods include: landing a multi-mission spacecraft upon a lunar surface; detaching a mobile machine from the spacecraft; and deploying a landing pad material over a landing area adjacent to the spacecraft.

Some methods include: landing a spacecraft upon a landing site of a lunar surface, the spacecraft comprising a landing pad material and a mobility means; and moving the spacecraft about the lunar surface while deploying the landing pad material either adjacent to the landing site or at a location distant from the landing site.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description is not intended to be exhaustive or to limit the invention to the precise form disclosed above. While specific embodiments of, and examples are described above for illustrative purposes, various equivalent modifications are possible within the scope of the disclosed invention(s), as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings provided herein can be applied to other systems, not necessarily the system described above. The elements and acts of the various embodiments described above can be extracted, subdivided, and/or combined to provide further embodiments.

While certain embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

Reference throughout this specification to "some embodiments" or "an embodiment" means that a particular feature, structure or characteristic described in connection with the embodiment is included in at least some embodiments. Thus, appearances of the phrases "in some embodiments" or "in an embodiment" in various places throughout this specification are not necessarily all referring to the same embodiment and may refer to one or more of the same or different embodiments. Furthermore, the particular features, structures or characteristics can be combined in any suitable manner, as would be apparent to one of ordinary skill in the art from this disclosure, in one or more embodiments.

As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment.

Embodiments of the disclosed systems and methods can be used and/or implemented with local and/or remote devices, components, and/or modules. The term "remote" may include devices, components, and/or modules not stored locally. Thus, a remote device may include a device which is physically located in the same general area and connected via a device such as a switch or a local area network. In other situations, a remote device may also be located in a separate geographic area, such as, for example, in a different location, building, valley, and so forth.

A number of applications, publications, and external documents may be incorporated by reference herein. Any conflict or contradiction between a statement in the body text of this specification and a statement in any of the incorporated documents is to be resolved in favor of the statement in the body text.

Although described in the illustrative context of certain preferred embodiments and examples, it will be understood by those skilled in the art that the disclosure extends beyond the specifically described embodiments to other alternative embodiments and/or uses and obvious modifications and equivalents. Thus, it is intended that the scope of the claims which follow should not be limited by the particular embodiments described above.

What is claimed is:

1. A landing pad for deployment on the Moon, comprising:

a deployable surface configured to be stored in a stowed configuration on a spacecraft and be deployed into a deployed configuration on a surface of the Moon; and a landing system configured to reduce an impact force between the landing pad and the surface of the Moon as the landing pad is landed on the surface, wherein the deployable surface is further configured to reduce or eliminate scattering of loose material from the surface of the Moon in the deployed configuration, and wherein the deployable surface is formed of a material having a density that is lower than a threshold density at which the landing pad can fall freely in lunar gravity without the impact force of the landing pad damaging the deployable surface.

2. The landing pad of claim 1, wherein the landing system comprises:

one or more braking thrusters configured to slow the landing pad's descent during landing of the landing pad.

3. The landing pad of claim 2, wherein the one or more braking thrusters are further configured to shut down a threshold distance above the surface of the Moon to reduce or prevent the loose material from being scattered by exhaust plumes from the braking thruster.

4. The landing pad of claim 2, wherein the one or more braking thrusters are further configured to provide an amount of thrust that is small enough to reduce or prevent the loose material from being scattered by the braking thruster's exhaust plumes when the landing pad is greater than a threshold distance from the surface of the Moon.

5. The landing pad of claim 1, wherein the deployable surface is configured to be used for landing of a plurality of spacecraft.

6. The landing pad of claim 1, wherein the landing system is further configured to unfurl the deployable surface before landing on the surface of the Moon.

7. The landing pad of claim 6, wherein the landing system is further configured to cause the deployable surface to rotate such that centrifugal forces spread out the deployable surface into the deployed configuration.

8. The landing pad of claim 6, wherein the landing system comprises one or more shape memory materials configured to cause the deployable surface to spread out into the deployed configuration after the landing pad is released from storage on the spacecraft.

9. The landing pad of claim 6, wherein the landing system comprises one or more thrusters configured to provide forces to unfurl the deployable surface.

10. The landing pad of claim 1, wherein the deployable surface comprises a continuous membrane.

11. The landing pad of claim 1, wherein the deployable surface comprises a woven fabric.

12. The landing pad of claim 1, wherein the deployable surface comprises a plurality of flat plates.

13. The landing pad of claim 12, wherein the flat plates are formed of metal.

14. The landing pad of claim 12, wherein the flat plates are formed of ceramic.

15. The landing pad of claim 12, wherein the flat plates are hinged together, and flat plates are configured to fold out to be deployed into the deployed configuration.

16. A landing pad for deployment on a celestial body, comprising:

a deployable surface configured to be stored in a stowed configuration on a spacecraft and be deployed into a deployed configuration on a surface of the celestial body; and a landing system configured to reduce an impact force between the landing pad and the surface of the celestial body as the landing pad is landed on the surface, the landing system comprising a balloon configured to reduce the impact force between the landing pad and the surface of the celestial body as the landing pad is landed on the surface, wherein the deployable surface is further configured to reduce or eliminate scattering of loose material from the surface of the celestial body in the deployed configuration.

* * * * *